US009771152B2

(12) United States Patent
Thomas et al.

(10) Patent No.: US 9,771,152 B2
(45) Date of Patent: Sep. 26, 2017

(54) FLEXBEAM TO ROTOR BLADE INTERFACE

(71) Applicant: Sikorsky Aircraft Corporation, Stratford, CT (US)

(72) Inventors: Justin Thomas, New Haven, CT (US); Eric Lucien Nussenblatt, Stamford, CT (US); Eric S. Parsons, New Haven, CT (US); Ryan Thomas Casey, San Diego, CA (US); David H. Hunter, Cheshire, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 734 days.

(21) Appl. No.: 13/847,702

(22) Filed: Mar. 20, 2013

(65) Prior Publication Data

US 2014/0286774 A1  Sep. 25, 2014

(51) Int. Cl.
*B64C 27/33* (2006.01)
*B64C 27/48* (2006.01)
*B64C 27/473* (2006.01)

(52) U.S. Cl.
CPC ............ *B64C 27/33* (2013.01); *B64C 27/473* (2013.01); *B64C 27/48* (2013.01); *Y10T 29/49332* (2015.01)

(58) Field of Classification Search
CPC ....... B64C 27/33; B64C 27/471; B64C 27/48; Y10T 27/49332
USPC .................................. 416/134 A, 220 A, 226
See application file for complete search history.

(56) References Cited

U.S. PATENT DOCUMENTS

| | | | |
|---|---|---|---|
| 3,310,119 A | | 3/1967 | Watson |
| 4,601,639 A | | 7/1986 | Yen et al. |
| 4,898,515 A | | 2/1990 | Beno et al. |
| 5,047,106 A | | 9/1991 | Matsumoto et al. |
| 5,364,230 A | | 11/1994 | Krauss et al. |
| 5,417,549 A | | 5/1995 | Purse et al. |
| 5,738,494 A | | 4/1998 | Schmaling |
| 6,000,453 A | | 12/1999 | Davis |
| 6,113,352 A | * | 9/2000 | Certain et al. ............ 416/134 A |
| 6,695,583 B2 | | 2/2004 | Schmaling et al. |
| 2009/0084891 A1 | | 4/2009 | Darrow, Jr. et al. |
| 2012/0087797 A1 | | 4/2012 | Kuntze-Fechner |
| 2013/0064674 A1 | | 3/2013 | Hunter et al. |

FOREIGN PATENT DOCUMENTS

EP        2730503 A2    5/2014

OTHER PUBLICATIONS

International Search Report for application PCT/US14/31010, dated Nov. 12, 2014, 7 pages.

(Continued)

*Primary Examiner* — Mark A Laurenzi
*Assistant Examiner* — Dapinder Singh
(74) *Attorney, Agent, or Firm* — Cantor Colburn LLP (57) ABSTRACT

A spar for a rotor blade assembly is provided including a generally hollow tubular body. A spacer protrudes from at least one surface of the body along a length of the body. A hole extends through the body and the spacer. The hole is configured to align with a through hole in an adjacent flexbeam assembly. The spacer is configured to contact a surface of the adjacent flexbeam assembly to create a match fit between the body and the flexbeam assembly.

20 Claims, 6 Drawing Sheets

(56) References Cited

OTHER PUBLICATIONS

Written Opinion for application PCT/US14/31010, dated Nov. 12, 2014, 5 pages.
International Search Report and Written Opinion for International Appln. No. PCT/US2015/037895; International Filing Date: Jun. 26, 2015; Date Mailed: Sep. 30, 2015, pp. 1-14.

* cited by examiner

FLEXBEAM TO ROTOR BLADE INTERFACE

BACKGROUND OF THE INVENTION

This invention relates to a rotor system of a rotary wing aircraft and, more particularly, to a rotor blade assembly for a rotary wing aircraft.

Conventional rotary wing aircrafts, such as helicopters for example, include a rotor hub configured to rotate about an axis and having multiple rotor blade assemblies mounted thereto. Each rotor blade assembly includes a flexbeam extending outwardly from the rotor hub through the hollow center of a spar or torque tube. The spar is coupled to an outboard end of the flexbeam such that rotation of the rotor hub is transmitted to the spar. The interface between the flexbeam and the spar often requires installation of a plurality of shims and assembly of separate upper and lower spar components. In applications where the interface between the flexbeam and the spar is not near either end of the spar, the installation of shims and other components may be imprecise.

In addition, hard tooling is used to form an inner mold line surface of the torque tube or spar. This type of tooling and the process used to manufacture a spar is complex and intolerant of redesign or development changes to improve the ease of assembling the spar and flexbeam. Generally such changes require large technical and financial investments, as well as a large amount of time.

BRIEF DESCRIPTION OF THE INVENTION

According to one embodiment of the invention, a spar for a rotor blade assembly is provided including a generally hollow tubular body. A spacer protrudes from at least one surface of the body along a length of the body. A hole extends through the body and the spacer. The hole is configured to align with a through hole in an adjacent flexbeam assembly. The spacer is configured to contact a surface of the adjacent flexbeam assembly to create a match fit between the body and the flexbeam assembly.

According to another embodiment of the invention, a rotor blade assembly is provided including a flexbeam. A clamp positioned at an outboard end of the flexbeam includes a first through hole. A generally hollow tubular spar surrounds the flexbeam. The spar includes a second through hole substantially aligned with the first through hole of the clamp. A spacer protrudes from a portion of the spar surrounding the second through hole. The spacer is configured to create a match fit between the spar and the clamp. A fastener assembly extends through the aligned first through hole and second through hole to couple the spar to the outboard end of the flexbeam.

According to yet another embodiment of the invention, a method of forming a rotor blade including a generally hollow tubular spar having at least one spacer protruding from a portion thereof is provided including forming a first through hole in both the spar and the spacer. A flexbeam is inserted into the spar. A clamp having a second through hole is arranged at an outboard end of the flexbeam. The second through hole in the clamp is substantially aligned with the first through hole in the spar. A portion of the spacer is removed to create a match fit between the spar and the clamp. A fastening assembly is installed to couple the spar to the flexbeam.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
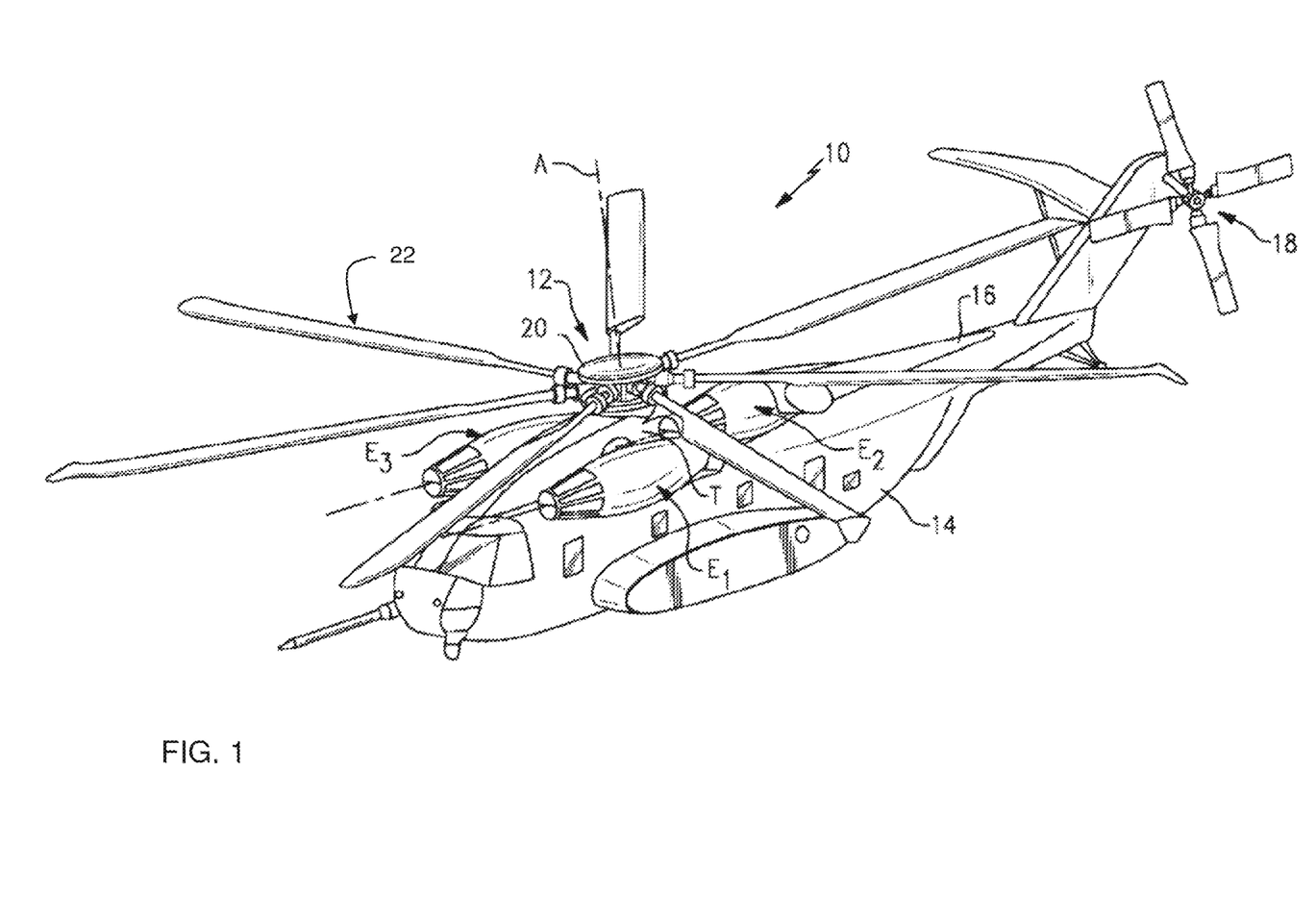
FIG. 1 is a perspective view of an exemplary rotary wing aircraft.

FIG. 1 schematically illustrates a rotary-wing aircraft 10 having a main rotor system 12. The aircraft 10 includes an airframe 14 having an extending tail 16 which mounts a tail rotor system 18 as an anti-torque system. The main rotor assembly 12 is driven about an axis of rotation A through a main gearbox (illustrated schematically at T) by one or more engines E. The main rotor system 12 includes a rotor hub 20 having a plurality of rotor blade assemblies 22 mounted to and projecting radially outwardly therefrom. Although a particular helicopter configuration is illustrated and described in the disclosed non-limiting embodiment, other configurations and/or machines, such as high speed compound rotary wing aircraft with supplemental translational thrust systems, dual contra-rotating coaxial rotor system aircraft, turboprops, tilt-rotors, and tilt-wing aircraft, will also benefit from the present invention.

Figure 2:
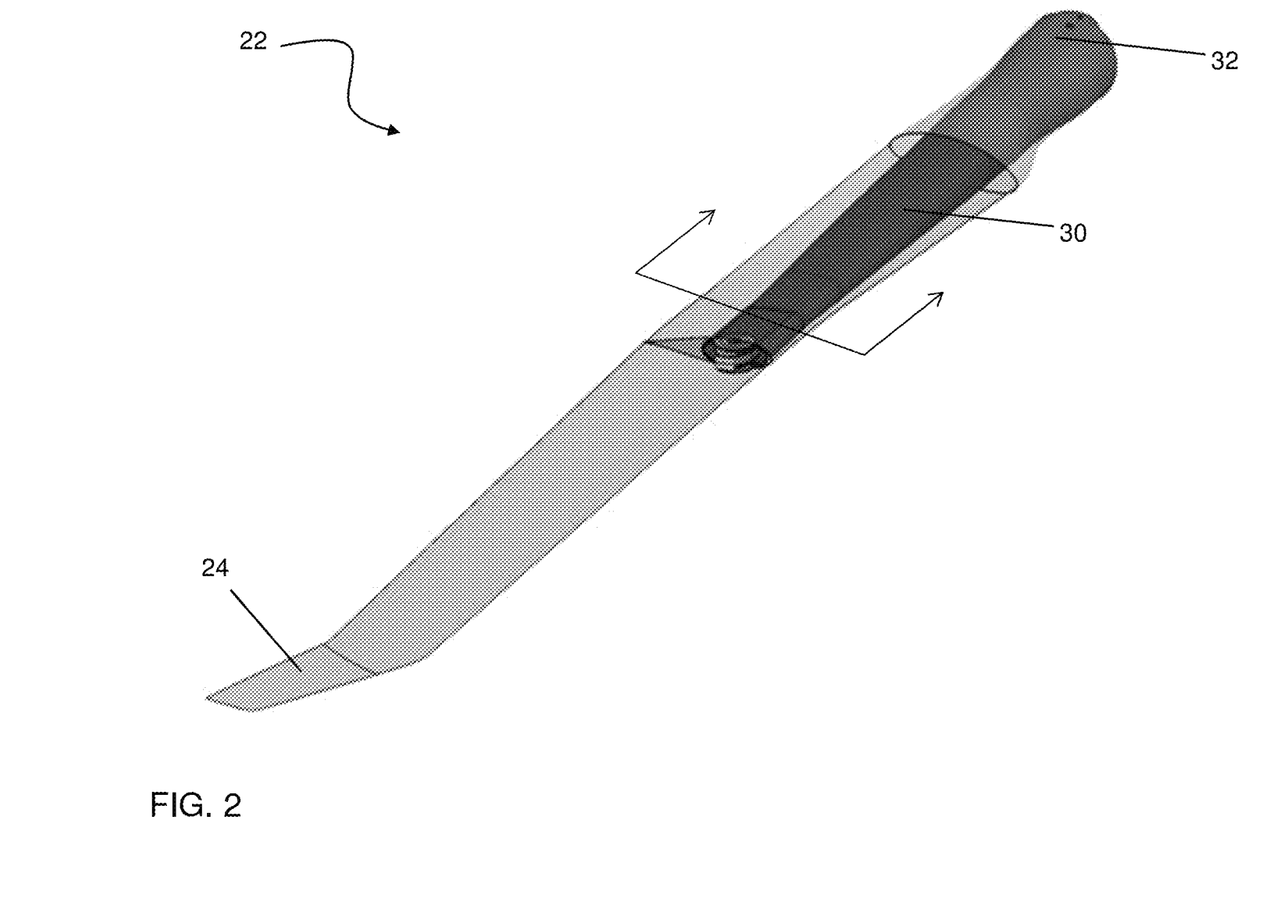
FIG. 2 is a perspective view of a rotor blade assembly of a main rotor system of a rotary wing aircraft according to an embodiment of the invention.

Referring now to the exemplary rotor blade assembly 22 illustrated in FIG. 2, a generally hollow, tubular spar 30 configured to couple to the rotor hub 20 at an inboard end 32 extends over at least a portion of the length of the rotor blade assembly 22. In one embodiment, the spar 30 may extend to the blade tip 24 of the rotor blade assembly 22. The cross-section of the spar 30 may vary in size and shape over the length of the spar 30 depending on the contour of the rotor blade assembly 22. The spar 30 is a structural member having a high torsional and axial stiffness and strength and, therefore, may be made from a high strength material, including but not limited to metal, graphite, fiberglass or some combination thereof. While shown with tip 24 having swept geometry, it is understood that the tip 24 need not have a swept geometry in all embodiments of the invention.

Figure 3:
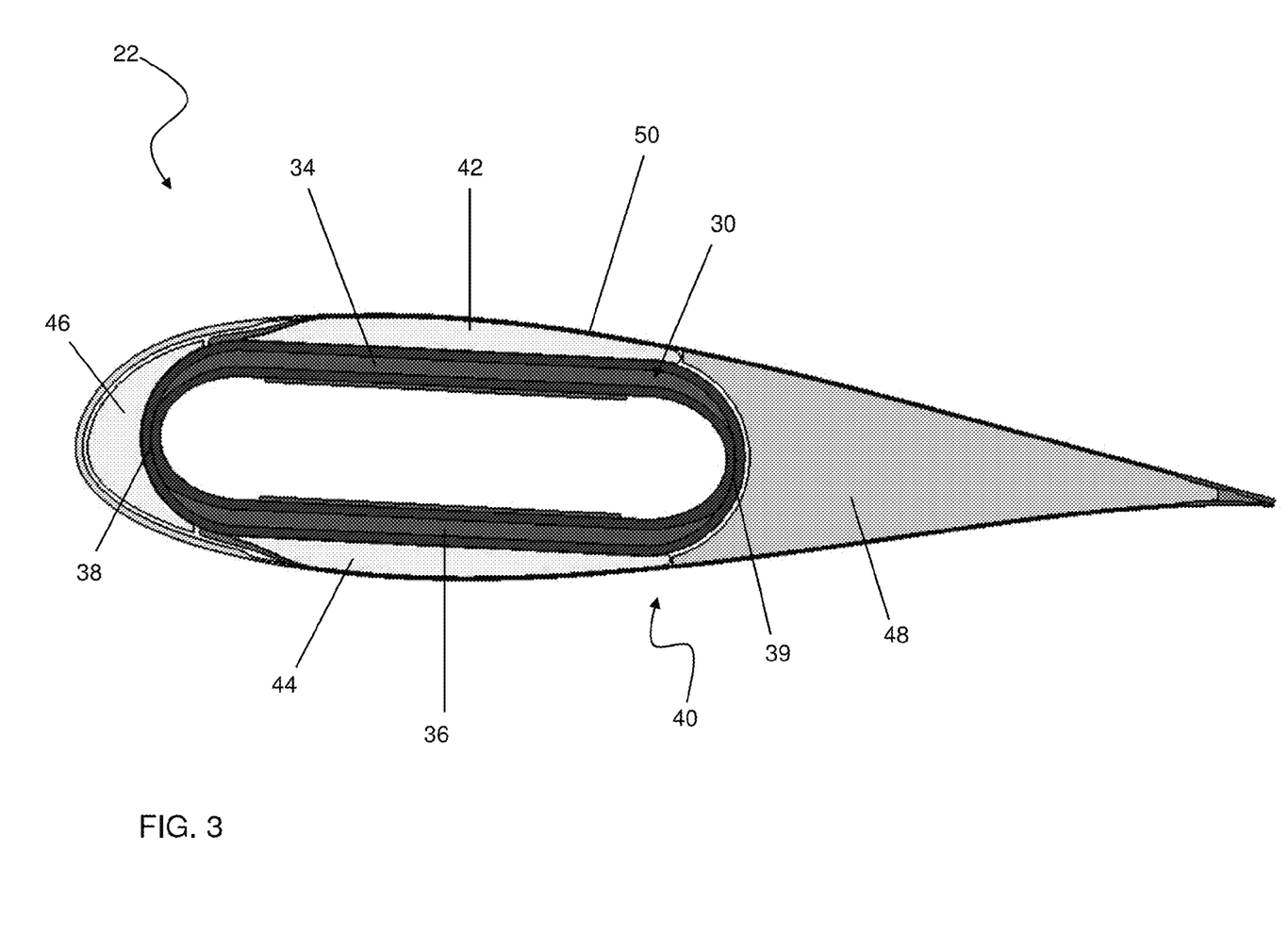
FIG. 3 is a cross-sectional view of a portion of a rotor blade assembly according to an embodiment of the invention.

To create a rotor blade assembly 22 having an airfoil shaped cross-section, a plurality of blocks 40 are bonded to the spar 30 (see FIG. 3). The plurality of blocks 40 may include a composite material, such as formed through compression molding, an additive manufacturing process, or any combination of processes for example. Alternatively, the blocks 40 may include a generally foam or honeycomb material. An upper airfoil block 42 is connected to the upper portion 34 of the spar 30, and a lower airfoil block 44 is fastened opposite the upper airfoil block 42, adjacent the lower portion 36 of the spar. Similarly, a leading edge block 46 and a core 48 are bonded opposite one another about the spar 30, to a first sidewall 38 and a second sidewall 39, respectively. One or more skins 50 (such as an upper skin and a lower skin for example) extend around an exterior of the plurality of blocks 40 positioned about the spar 30. The skin 50 provides the rotor blade assembly 22 with a generally uniform, smooth, exterior surface 26.

Figures 4, 5:
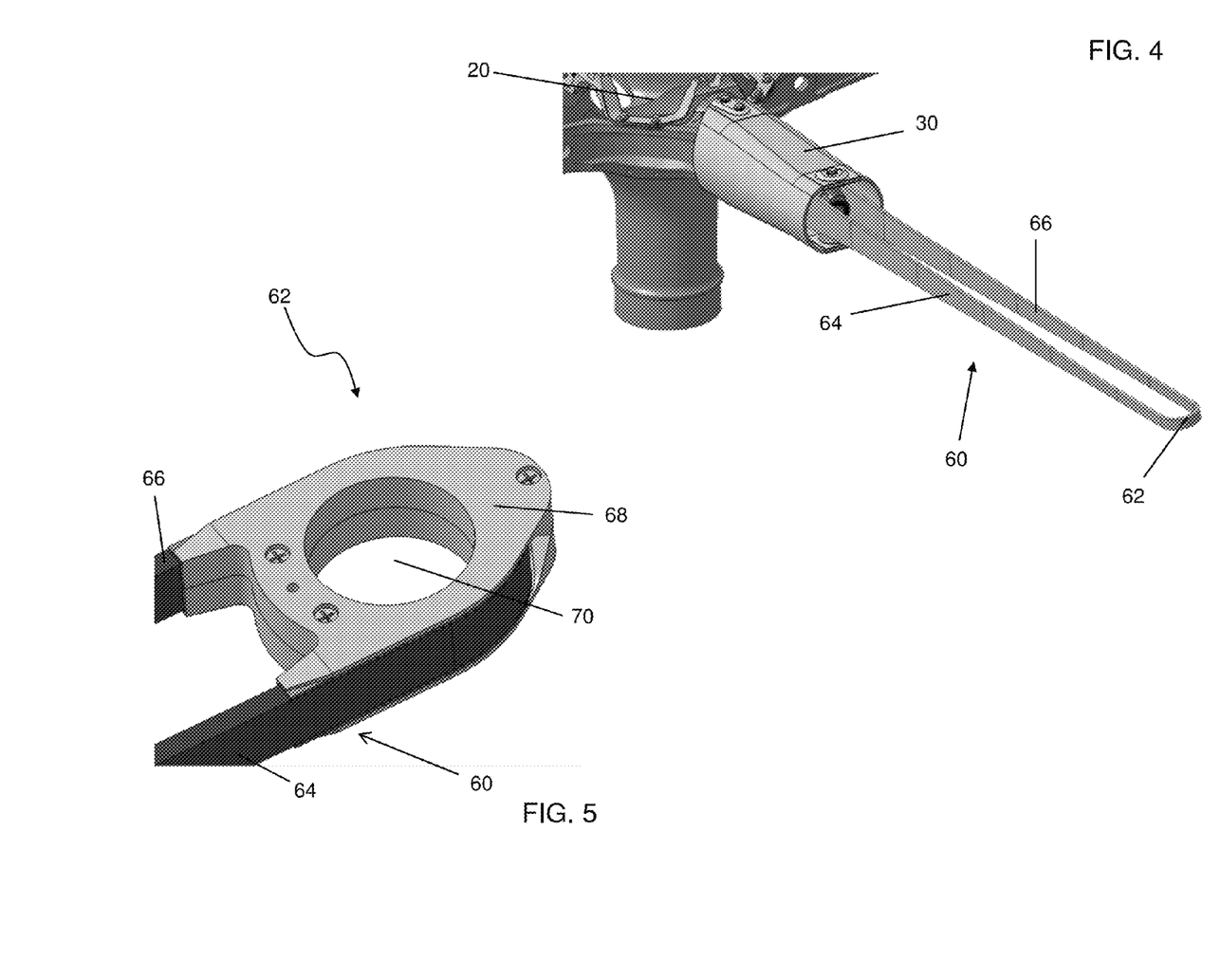
FIG. 4 is a perspective view of a flexbeam coupled to a rotor hub of a main rotor system according to an embodiment of the invention.
FIG. 5 is a perspective view of a clamp arranged at an outboard end of a flexbeam according to an embodiment of the invention.

As shown in FIG. 4, extending from the rotor hub 20, through at least a portion of the hollow spar 30 is a substantially U-shaped flexible structural member 60, having a substantially identical first arm 64 and second arm 66 connected by an outboard end 62. The flexible structural member 60 (also referred to as a flexbeam) is commonly wrapped in a protective, buffer material and serves to couple the rotor blade assembly 22 to the rotor hub 20. The width of each arm 64, 66 of the flexbeam 60 may vary over the length of the flexbeam, as illustrated in FIG. 4; however, the thickness of the flexbeam 60 remains generally constant. As shown in FIG. 5, a clamp 68 having a central through hole 70 is arranged adjacent the outboard end 62 of the flexbeam 60, between the first and second arms 64, 66.

Figure 6:
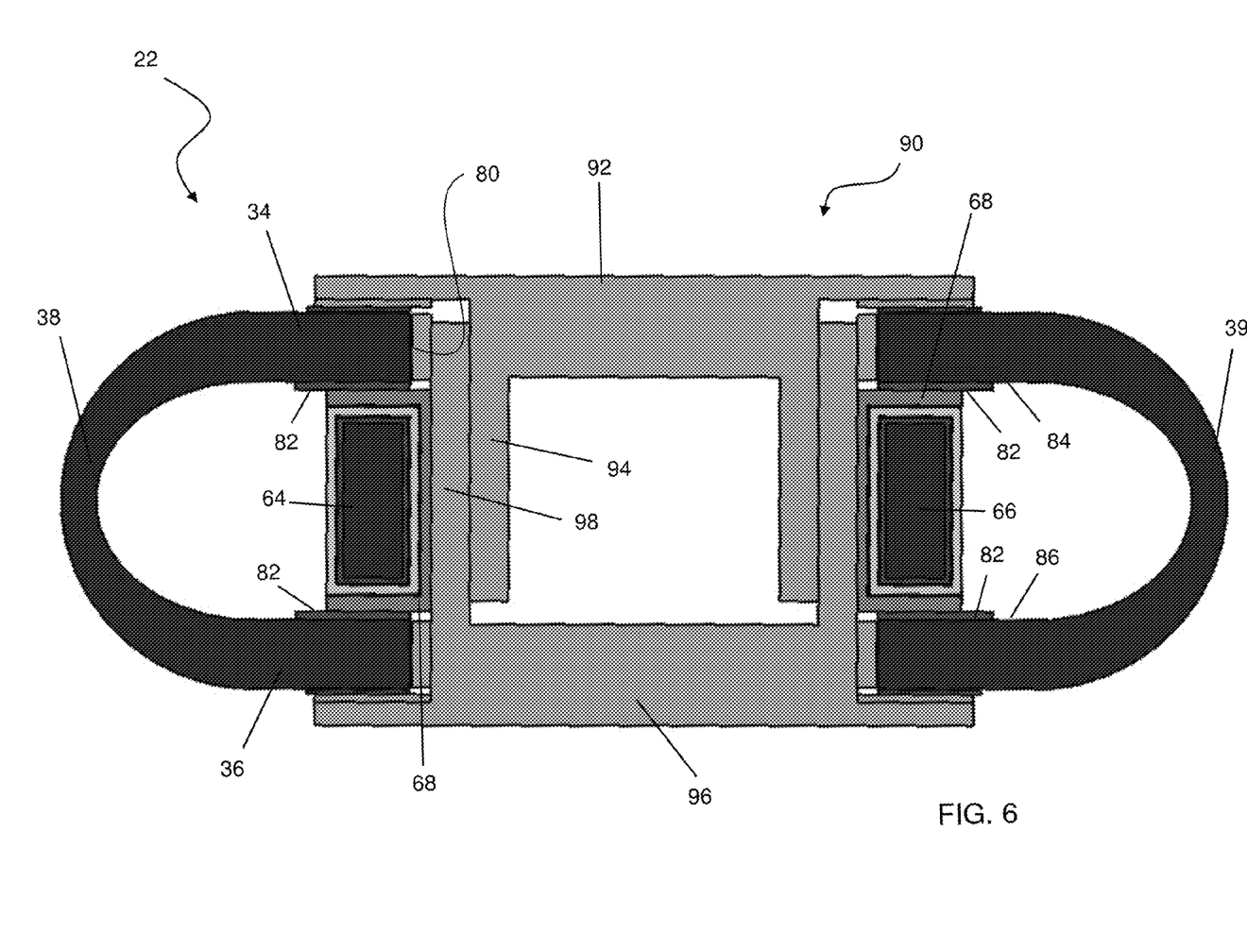
FIG. 6 is a cross-sectional view of a portion of a rotor blade assembly near the outboard end of the flexbeam according to an embodiment of the invention.

As shown in FIG. 6, a portion of the spar 30 near the outboard end 62 of the flexbeam 60 (such as the mid-span region for example) may include a hole 80 extending through both the upper and lower portions 34, 36. The hole 80 is arranged generally coaxially with the through hole of the clamp 68 and may have a diameter substantially similar to the diameter of the through hole 70. While not required in all aspects, a spacer 82 may be integrally formed with at least one interior surface of the spar 30, such as surfaces 84, 86 for example, and is at least shown directly adjacent the clamp 68. However, it is understood that the spacer 82 may be attached to the spar 30, such as with an adhesive for example. The spacer 82 may extend over only a localized portion of the length of the spar 30, for example the portion of the spar 30 configured to mate with the clamp 68. However, for convenience, the spacer 82 may extend over the entire length of the spar 30. In one embodiment, the spacer 82 is formed from a resilient, deformable material, such as a fiberglass composite material for example.

Figure 7:
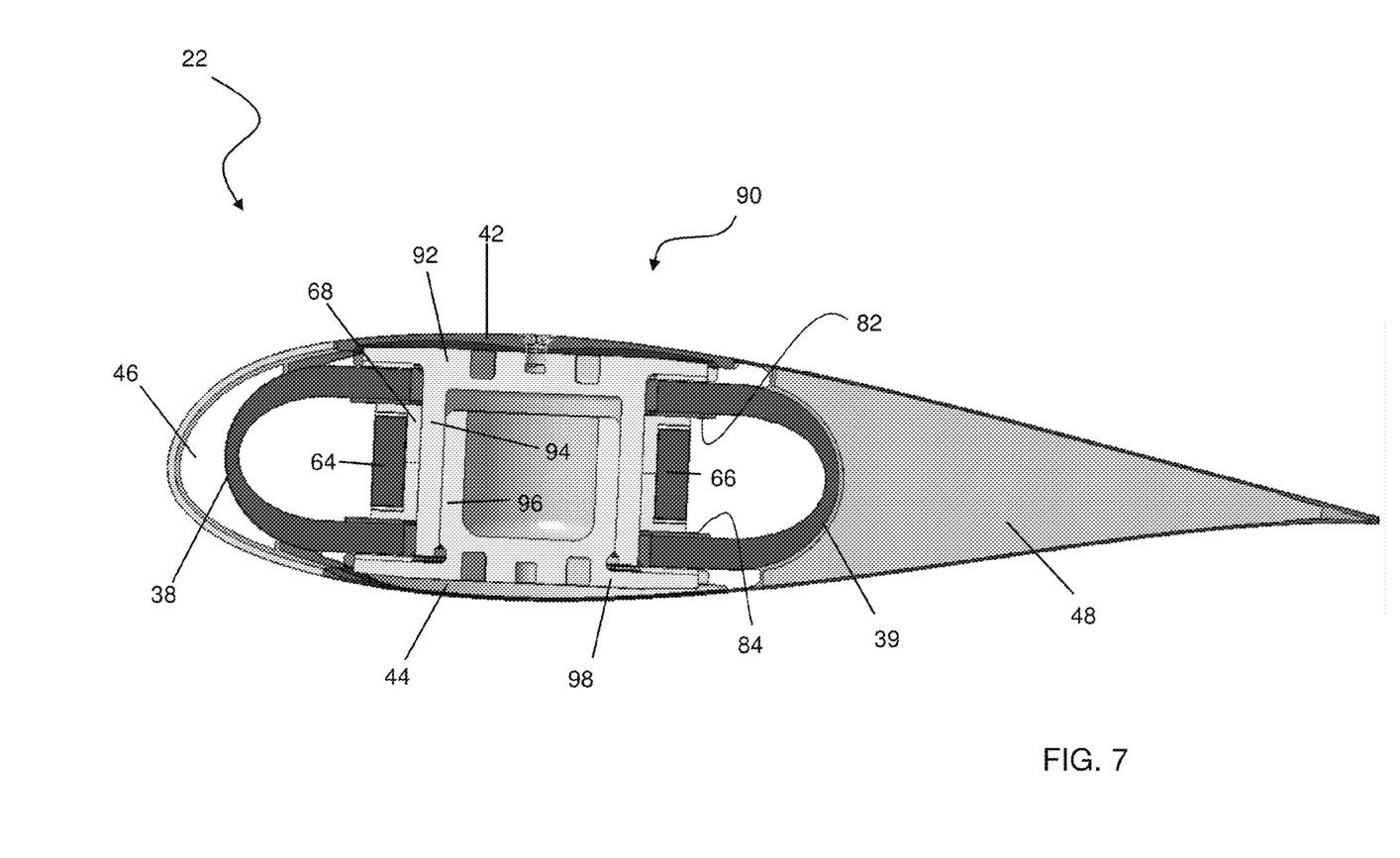
FIG. 7 is a cross-sectional view of a rotor blade assembly near the outboard end of the flexbeam according to an embodiment of the invention.

Referring now to FIGS. 6 and 7, the cross-section of the rotor blade assembly 22 taken at the aligned hole 80 of the spar 30 and through hole 70 of the clamp 68 is illustrated. A fastener assembly 90 extends through hole 80 to couple the spar 30 to the flexbeam 60. In the illustrated embodiment, the fastener assembly 90 includes a first fastener 92 configured to extend from the upper portion 34 at least partially through the spar 30 and the flexbeam 60, as well as a second, complementary fastener 96 configured to extend from the lower portion 36 at least partially through the spar 30 and the flexbeam 60. In the shown embodiment, a shaft 94 of the first fastener 92 is received in a nesting manner within a shaft 98 of the second fastener 96. In one embodiment, the first fastener 92 and the second fastener 96 are configured to threadably couple to one another. However, other types of fasteners 90 may also be used, such as where the shafts 94, 98 are press-fit into the nesting orientation. The fastener assembly 90 compresses the spar 30 against the arms 64, 66 of the flexbeam 60. In the illustrated embodiment, the spacer 82, extending inwardly from the spar 30, is positioned between the spar 30 and the arms 64, 66 of the flexbeam 60 to ensure proper spacing and alignment of the fastener assembly 90, spar 30, and flexbeam 60. The material of the spacer 82 may be machined as needed to ensure a proper connection between the spar 30 and the flexbeam 60.

To create a rotor blade assembly 22, the spar 30 is manufactured including having a spacer 82 extending from at least a portion of a first interior surface 84 of the spar 30. The hole 80 configured to align with the through hole 70 of the clamp 68 coupled to the flexbeam 60 is then formed in the spar 30. Material is removed from the spacer 82 as necessary, such as by machining for example, to create a match fit between the spar 30 and the surface of the clamp 68 and flexbeam 60 configured to contact the spacer 82. In one embodiment, the hole 80 formed in the spar 30 is large enough such that a cutting tool may be inserted through the hole 80 to remove some of the material of the spacer 82. Once the spar 30 and flexbeam 60 are properly aligned, the fastener assembly 90 is installed to couple to the spar 30 and the flexbeam 60.

By integrally forming a spacer 82 onto the surfaces of the spar 30 configured to contact the clamp 68 and flexbeam 60, no shims or additional components are required to create a precise fit between the spar 30 and the flexbeam 60. The spar 30 may therefore be formed as a unitary body using known design and manufacturing processes. In addition, use of a large diameter fastener assembly 90 to couple the spar 30 to the clamp 68 of the flexbeam 60 improves the ease of installation of the assembly. As a result, the overall complexity, cost, and time to assemble the rotor blade assembly 22 are reduced.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. By way of example, the spacer 82 could be disposed on the flexbeam 60 instead of, or in addition to on the spar 30. Additionally, while various embodiments of the invention have been described, it is to be understood that aspects of the invention may include only some of the described embodiments.

Accordingly, the invention is not to be seen as limited by the foregoing description, but is only limited by the scope of the appended claims.

What is claimed is:

1. A spar for a rotor blade assembly comprising:
   a generally hollow, tubular body;
   a flexbeam assembly disposed within the body, the flexbeam assembly including a first arm and a second arm separated from one another at an inboard end and connected at an outboard end;
   a spacer extending from at least one surface of the body along a length of the body; and
   a hole extending through both the body and the spacer, wherein the hole is configured to align with a through hole in the flexbeam assembly and the spacer is configured to contact a surface of the flexbeam assembly to create a match fit between the body and the flexbeam assembly.

2. The spar according to claim 1, wherein the length of the spacer is less than the length of the body.

3. The spar according to claim 1, wherein the spacer extends inwardly from a first surface and a second, opposite surface.

4. The spar according to claim 3, wherein the first surface and the second surface are generally parallel.

5. The spar according to claim 1, wherein the spacer is formed integrally with the body.

6. The spar according to claim 1, wherein the spacer is formed from a composite material.

7. The spar according to claim 1, wherein the body is formed from a metal, graphite, or fiberglass material, or combinations thereof.

8. A rotor blade assembly comprising:
   a flexbeam including a first arm and a second arm separated from one another at an inboard end and connected at an outboard end;
   a clamp positioned at the outboard end of the flexbeam including a first through hole;
   a generally hollow tubular spar surrounding the flexbeam, the spar having a second through hole substantially aligned with the first through hole of the clamp;
   a spacer protruding from a portion of the spar surrounding the second through hole, the spacer being configured to create a match fit between the spar and the clamp; and
   a fastener assembly extending through the aligned first through hole and second through hole to couple the spar to the outboard end of the flexbeam.

9. The rotor blade assembly according to claim 8, wherein the spacer extends inwardly from a first surface and a second, opposite surface of the spar.

10. The rotor blade assembly according to claim 9, wherein the first surface and the second surface are generally parallel.

11. The rotor blade assembly according to claim 8, wherein the spacer is formed integrally with the spar.

12. The rotor blade assembly according to claim 8, wherein the spacer is formed from a composite material.

13. The rotor blade assembly according to claim 8, wherein the body is from metal, graphite, or fiberglass material, or combinations thereof.

14. A method of forming a rotor blade assembly including a generally hollow tubular spar having at least one spacer extending from a portion thereof, the method comprising:
    forming a first through hole in both the spar and the spacer;
    inserting a flexbeam having a first arm and a second arm separated from one another at an inboard end and connected at an outboard end into the spar such that a second through hole in a clamp arranged at the outboard end of the flexbeam is aligned with the first through hole;
    removing a portion of the spacer to create a match fit between the spar and the clamp; and
    installing a fastening assembly to couple the spar to the flexbeam.

15. The method according to claim 14, wherein the spacer is formed integrally with the spar.

16. The method according to claim 14, wherein the spacer is formed from a composite material.

17. The method according to claim 14, wherein the portion of the spacer is removed using a cutting tool.

18. The method according to claim 14, wherein the spar is manufactured as a single piece.

19. The method according to claim 14, wherein the fastening assembly is installed through the aligned first through hole and second through hole.

20. The method according to claim 14, wherein the fastening assembly compresses the spacer between the spar and the flexbeam.

* * * * *